United States Patent
Fabbri et al.

(10) Patent No.: US 10,359,048 B2
(45) Date of Patent: Jul. 23, 2019

(54) SEALING SYSTEM AND TURBOPUMP COMPRISING SUCH A SYSTEM

(71) Applicant: SAFRAN AIRCRAFT ENGINES, Paris (FR)

(72) Inventors: Laurent Paul Lattanzio Fabbri, Gasny (FR); Vincent Langlois, La Haye-Malherbe (FR); Cedric Sene, Rouen (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 122 days.

(21) Appl. No.: 15/510,246

(22) PCT Filed: Sep. 8, 2015

(86) PCT No.: PCT/FR2015/052379
§ 371 (c)(1),
(2) Date: Mar. 10, 2017

(87) PCT Pub. No.: WO2016/038293
PCT Pub. Date: Mar. 17, 2016

(65) Prior Publication Data
US 2017/0292526 A1   Oct. 12, 2017

(30) Foreign Application Priority Data

Sep. 11, 2014 (FR) ................ 1458546

(51) Int. Cl.
*F16J 15/34* (2006.01)
*F04D 29/12* (2006.01)

(52) U.S. Cl.
CPC .......... *F04D 29/12* (2013.01); *F16J 15/3412* (2013.01); *F16J 15/3464* (2013.01)

(58) Field of Classification Search
CPC .......... F04D 29/12; F04D 29/08; F04D 29/10; F16J 15/3464; F16J 15/3472; F16J 15/3412
(Continued)

(56) References Cited

U.S. PATENT DOCUMENTS 4,330,133 A * 5/1982 Palfreyman ............ F16J 15/441
277/412
4,453,721 A * 6/1984 Angus .................... F16J 15/441
277/430
(Continued)

FOREIGN PATENT DOCUMENTS

DE   102 17 181 A1   11/2003
EP   2 698 567 A1   2/2014
(Continued)

OTHER PUBLICATIONS 4,880,244 drawing (Year: 1989).*
(Continued)

*Primary Examiner* — Nathan Cumar
(74) *Attorney, Agent, or Firm* — Oblon, McClelland, Maier & Neustadt, L.L.P.

(57) ABSTRACT

A sealing system for at least one floatingly mounted ring in a support for a rotary shaft rotatable about an axis directed along a longitudinal direction provides dynamic sealing between the shaft and the support. The system includes a coupling part interposed between the ring and the support, whereby the ring is secured to the support. A first cylindrical type joint directed with respect to a first transverse direction provides a joint between the support and the coupling part. A second cylindrical type joint directed with respect to a second transverse direction perpendicular to the first transverse direction provides a joint between the ring and the coupling part. A turbopump includes such rotary shafts and sealing systems.

13 Claims, 9 Drawing Sheets

(58) Field of Classification Search
USPC .......................................................... 277/503
See application file for complete search history.

(56) References Cited

U.S. PATENT DOCUMENTS

| | | | | | |
|---|---|---|---|---|---|
| 4,880,244 | A | * | 11/1989 | Greune | .................... F16J 15/54 |
| | | | | | 277/422 |
| 2012/0261887 | A1 | * | 10/2012 | Vasagar | ................ F01D 11/003 |
| | | | | | 277/543 |
| 2014/0049009 | A1 | * | 2/2014 | Jahn | ........................ F16J 15/30 |
| | | | | | 277/510 |

FOREIGN PATENT DOCUMENTS

| | | |
|---|---|---|
| RU | 2 341 589 C2 | 12/2008 |
| RU | 2013 113 720 A | 10/2014 |

OTHER PUBLICATIONS

International Search Report dated Dec. 17, 2015 in PCT/FR2015/052379 filed Sep. 8, 2015.
Decision to Grant issued in Russian Patent Application No. 2017112043 on Feb. 5, 2019 (w/ English Translation).

* cited by examiner

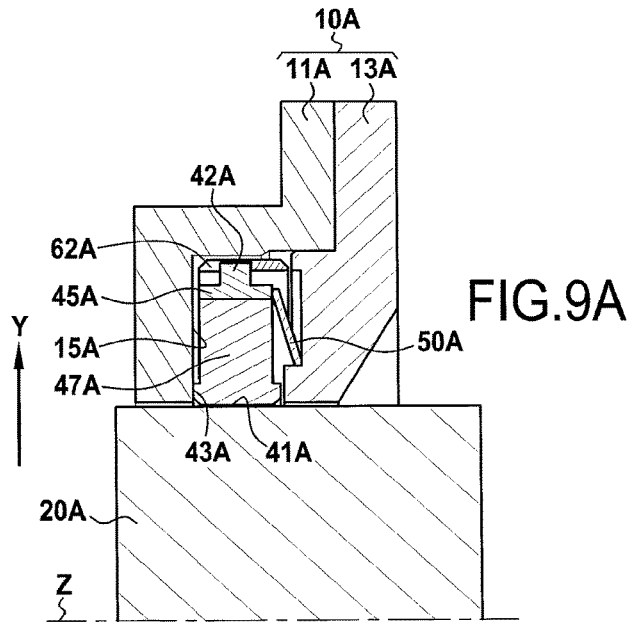
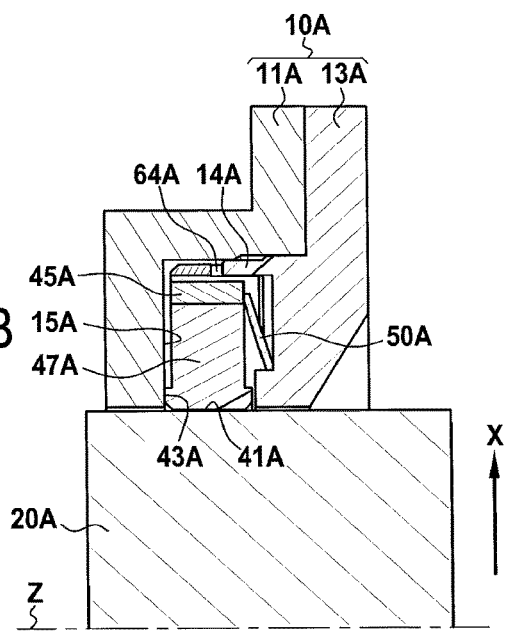
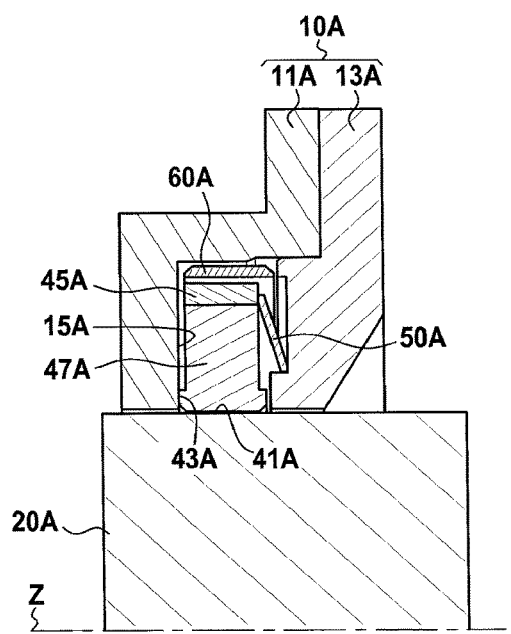

SEALING SYSTEM AND TURBOPUMP COMPRISING SUCH A SYSTEM

FIELD OF THE INVENTION

The present description relates to a sealing system for establishing dynamic sealing between a rotary shaft and its support, in particular a turbopump shaft. The present description also relates to such a turbopump.

STATE OF THE PRIOR ART

A turbopump conventionally comprises (see for example FIG. 3 of patent application FR 2 772 843 A1) turbine elements that are fed with a stream of hot gas in order to drive a rotary shaft; and pump elements driven in rotation by the rotary shaft in order to drive a liquid, e.g. liquid hydrogen for feeding to a rocket engine.

Such a turbopump needs to have a sealing system that is capable of providing dynamic sealing for the rotary shaft at the interface between the turbine portion and the pump portion in order to prevent the driving gas stream meeting the pumped liquid. Such a system must be capable of providing sealing that is continuous even when the rotary shaft is subjected to transverse movements, mainly as a result of vibration to which the shaft is subjected at a high speed of rotation (a turbopump shaft may rotate at several tens of thousands of revolutions per minute).

In known manner, such a sealing system is constituted by a ring that is floatingly mounted in a support of the rotary shaft. Such a ring serves to follow the transverse movements of the rotary shaft in order to prevent any degradation of the dynamic sealing caused by such movements and possible contacts with the rotor.

In contrast, such a floating ring needs to be prevented from turning about the axis of rotation of the rotary shaft when the shaft is moving. Fluid in rotation between the rotary shaft and the ring (particularly when the fluid is viscous), and the potential for contacts between the rotary shaft and the ring, serve to generate a torque about the axis of rotation of the rotary shaft, which torque needs to be countered in order to avoid any impacts at high speed that might otherwise be caused by the ring.

In order to avoid such rotation, the ring is joined directly to the support by one or more antirotation pegs regularly spaced around the circumference of the floating ring and co-operating with associated joint portions that are formed in the support.

A major drawback of that solution is that the presence of the antirotation peg(s) disturbs the operation of the ring (its ability to float) and this applies regardless of the improvements that have been devised so far (reducing clearance, increasing the axial length of the ring, etc. . . . ). The consequences of such disturbance may be:
  a loss of the ability to float;
  the ring tilting about one or more pegs;
  contact between the shaft and the ring liable to damage the ring or subject to premature wear and increased leaks;
  instability in the operation of the ring; and
  dulling of the edges or of the antirotation pegs.

There thus exists a need for developing a sealing system that is capable of providing dynamic sealing between a rotary shaft and its support in a manner that is both dependable and effective.

SUMMARY OF THE INVENTION

A first aspect of the present description relates to a sealing system for at least one floatingly mounted ring in a support for a rotary shaft rotatable about an axis directed along a longitudinal direction in order to provide dynamic sealing between the shaft and the support. The system comprises a coupling part interposed between the ring and the support, whereby the ring is secured to the support. The support and the coupling part comprise respective first joint portions suitable for co-operating together to provide a first kinematic joint allowing cylindrical joint type relative movement between the support and the coupling part with respect to a first transverse direction. The ring and the coupling part comprise second respective joint portions suitable for co-operating together to provide a second kinematic joint allowing cylindrical joint type relative movement between the ring and the coupling part with respect to a second transverse direction perpendicular to the first transverse direction.

In the present description, the term "longitudinal direction" is used to designate a direction parallel to the axis of rotation of the rotary shaft, which axis of rotation is thus directed in the longitudinal direction.

In the present description, the term "transverse direction" is used to designate a direction lying in a plane perpendicular to the above-mentioned longitudinal direction. Such a direction could thus be referred to as a "radial direction" relative to the axis of rotation of the rotary shaft. Such a perpendicular plane is thus referred to as a "transverse plane" in the present description. It could also be referred to as a "radial plane", relative to the axis of rotation of the rotary shaft.

In the present description, the term "a first kinematic joint allowing cylindrical joint type relative movement between the support and the coupling part with respect to a first transverse direction" is used to mean a joint between the support and the coupling part that allows for the following two degrees of freedom of movement between the support and the coupling part:
  a movement in rotation of the support and the coupling part relative to each other about a first transverse direction, perpendicular to the longitudinal direction; and
  a movement in translation of the support and the coupling part relative to each other along the same first transverse direction.

Likewise, in the present description, the term "a second kinematic joint allowing cylindrical joint type relative movement between the ring and the coupling part with respect to a second transverse direction perpendicular to the first transverse direction", is used to mean a joint between the ring and the coupling part that allows the following two degrees of freedom of movement between the ring and the coupling part:
  movement in rotation of the ring and the coupling part relative to each other with respect to a second transverse direction that is perpendicular to the longitudinal direction and that is perpendicular to the first transverse direction; and
  movement in translation of the ring and of the coupling part relative to each other along said second transverse direction.

Thus, by interposing a coupling part that is dissociated from the ring between the ring and the support so as to decouple the components of movement in the two transverse directions that are perpendicular relative to each other by means of first and second kinematic joints of the above-described type, the ring is capable of following any transverse movement of the rotary shaft, whether that movement is a movement in rotation or in translation.

Sealing, referred to as "primary" sealing, provided at an interface between respective circumferential surfaces of the rotary shaft and of the ring may also be achieved effectively.

Simultaneously, the fact that the first and second cylindrical type joints are directed respectively with respect to the first and second transverse directions, both of which are perpendicular to the longitudinal direction about which the rotary shaft rotates, prevents both the ring and the coupling part from turning about the longitudinal direction. Specifically, among the six potential degrees of freedom of the ring to move relative to the support, the only degree of freedom that is eliminated (in practice ignoring operating clearances) by this sealing system is the degree of freedom that corresponds to the ring performing a movement in rotation about the longitudinal direction (this degree of freedom being particularly well eliminated in practice when the clearances that exist between the portions of the first and second joints are small).

Thus, this solution enables dynamic sealing to be provided between the rotary shaft and the support, which sealing is both dependable and effective. The ring can easily follow transverse movements of the rotary shaft, while being prevented from being driven in rotation by the shaft about the longitudinal direction.

This solution can also be implemented compactly, since the coupling part can be interposed radially between the ring and the support.

In certain embodiments, the system may be such that each of the first joint portions is not deformable (under normal conditions of utilization of the sealing system).

Thus, when the respective first joint portions of the support and of the coupling part co-operate mutually to provide the first kinematic joint, none of these first joint portions deforms (under normal conditions of utilization of the sealing system).

In certain embodiments, the system may be such that each of the second joint portions is not deformable (under normal conditions of utilization of the sealing system).

Thus, when the respective second joint portions of the ring and of the coupling part co-operate mutually to provide the second kinematic joint, none of these joint portions deforms (under normal conditions of utilization of the sealing system).

In certain embodiments, the system may be such that at least one of the first joint portions is suitable for being deformed elastically, in compression and/or in bending and/or in twisting, as appropriate (under normal conditions of utilization of the sealing system).

Thus, when the respective first joint portions of the support and of the coupling part co-operate mutually to provide the first kinematic joint, at least one of these first joint portions (i.e. only one or each of the first joint portions belonging to the support and/or only one or each of the first joint portions belonging to the coupling part, as appropriate) deforms elastically in compression and/or in bending and/or in twisting, as appropriate (under normal conditions of utilization of the sealing system).

In certain embodiments, the system may be such that at least one of the second joint portions is suitable for being deformed elastically, in compression and/or in bending and/or in twisting, as appropriate (under normal conditions of utilization of the sealing system).

Thus, when the respective second joint portions of the ring and of the coupling part co-operate mutually to provide the second kinematic joint, at least one of these second joint portions (i.e. only one or each of the second joint portions belonging to the ring and/or only one or each of the second joint portions belonging to the coupling part, as appropriate) deforms elastically in compression and/or in bending and/or in twisting, as appropriate (under normal conditions of utilization of the sealing system).

In certain embodiments, the system may be such that it has a single pair of first joint portions belonging respectively to the support and to the coupling part and configured to co-operate mutually.

In certain embodiments, the system may be such that it includes at least a first pair of first joint portions belonging respectively to the support and to the coupling part and configured to co-operate mutually; and a second pair of first joint portions belonging respectively to the support and to the coupling part and configured to co-operate mutually, these first and second pairs being spaced apart from each other along the first transverse direction.

In certain embodiments, the system may be such that it includes a single pair of second joint portions belonging respectively to the ring and to the coupling part and configured to co-operate mutually.

In certain embodiments, the system may be such that it includes at least a first pair of second joint portions belonging respectively to the ring and to the coupling part and configured to co-operate mutually; and a second pair of second joint portions belonging respectively to the ring and to the coupling part and configured to co-operate mutually, these first and second pairs being spaced apart from each other along the second transverse direction.

In certain embodiments, the system may be such that the support and the ring include third respective joint portions suitable for co-operating together to provide a third kinematic joint allowing planar joint type relative movement between the support and the ring in a transverse plane.

In the present description, the term "a third kinematic joint allowing planar joint type relative movement between the support and the ring in a transverse plane" is used to designate a joint between the support and the ring that allows the following three degrees of freedom in movement between the support and the ring:

movement in translation of the ring and of the support relative to each other along the first transverse direction; and movement in translation of the ring and of the support relative to each other along the second transverse direction; and movement in rotation of the ring and of the support relative to each other about the longitudinal axis (even though in practice, as mentioned above, because of the presence of the first and second kinematic joints, this freedom to move in rotation is quite restricted insofar as the clearances provided between the first and second joint portions are likewise restricted).

Such a planar type joint between the support and the ring enables sealing referred to as "secondary" sealing to be provided effectively at an interface between two respective transverse plane surfaces of the support and of the ring that embody the respective third joint portions.

Dissociating the above-mentioned primary sealing, which is established between the rotary shaft and the ring, and the secondary sealing, which is established between the ring and the support, can make it easier to obtain effective overall sealing between the rotary shaft and the support.

Furthermore, the fact that the ring is allowed to pivot both about the first transverse direction and about the second transverse direction, because of the first and second kinematic joints of the above-specified type, contributes to providing continuity in the plane contact in the transverse plane that is set up by the third kinematic joint between the ring and the support.

In certain embodiments, the system may be such that it includes a bias element suitable for co-operating with the support and the ring to bias the co-operation between the respective third joint portions.

Such a bias element may also contribute to providing continuity in the above-mentioned plane contact by exerting a return force urging the support and the ring against each other.

In certain embodiments, the system may be such that the coupling part and the bias element are dissociated from each other.

In certain embodiments, the system may be such that the coupling part and the bias element are formed as a single unit, thereby simplifying the system and making it more compact in the longitudinal and/or transverse direction.

In certain embodiments, the system may be such that the transverse plane and the bias element are arranged longitudinally on either side of the ring.

Thus, the bias element is spaced apart in the longitudinal direction from the transverse plane in which plane contact is established between the support and the ring, with the ring being interposed between the bias element and that plane.

A second aspect of the present description provides a turbopump having a rotary shaft and a sealing system in accordance with the above-mentioned first aspect.

Nevertheless, without going beyond the ambit of the present description, it would be possible to make provision for mounting the sealing system in a rotary machine other than a turbomachine or a turbopump, providing such a rotary machine includes at least one rotary shaft where there is a need to provide dynamic sealing.

The above-specified characteristics and advantages, and others, appear better on reading the following detailed description of embodiments that have no limiting character and that are given merely by way of illustration. This detailed description makes reference to the accompanying drawings.

BRIEF DESCRIPTION OF THE DRAWINGS

The accompanying drawings are diagrammatic and not to scale, and they seek above all to show the principles set out in the present description. In the accompanying drawings:

FIGS. 9A, 9B, and 9C are fragmentary section views of respective planes A-A (along the second transverse direction Y), B-B (along the first transverse direction X), and C-C, as shown in FIG. 8;

DETAILED DESCRIPTION OF EMBODIMENTS

Figure 1:
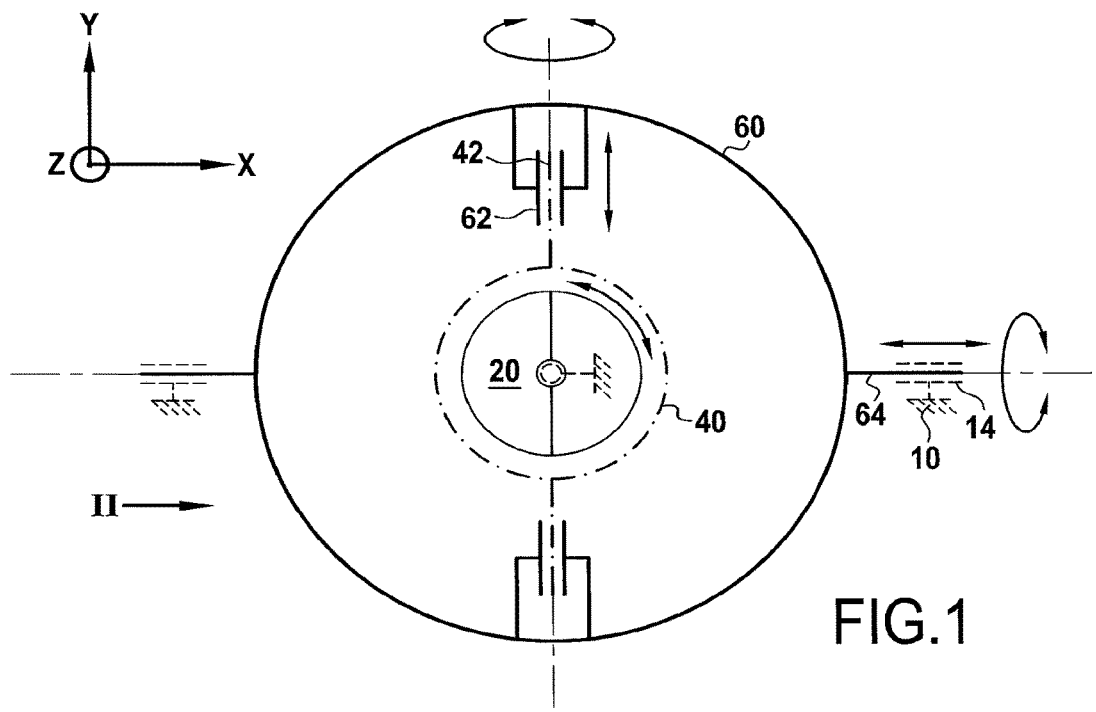
FIG. 1 is a first kinematic diagram of a sealing system in accordance with the present description, when observed from a transverse plane.
Figure 2:
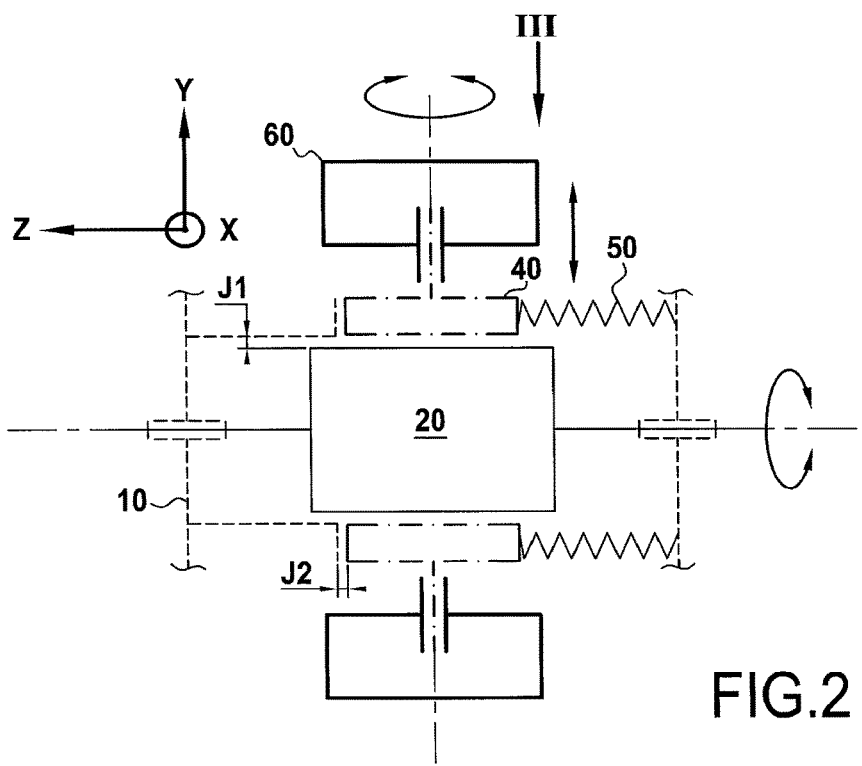
FIG. 2 is a second kinematic diagram of the sealing system when observed from a first longitudinal plane going in a first transverse direction.
Figure 3:
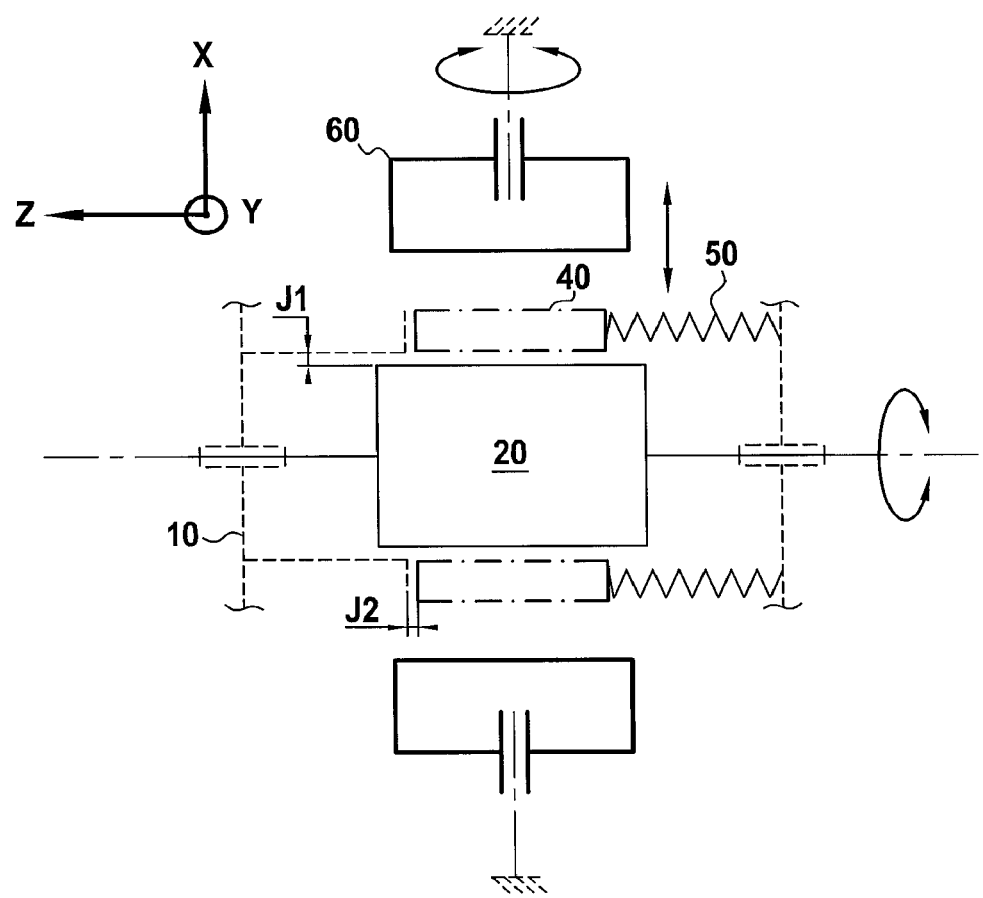
FIG. 3 is a third kinematic diagram of the sealing system when it is observed from a second longitudinal plane going in a second transverse direction perpendicular to the first transverse direction.

FIGS. 1 to 3 are kinematic diagrams showing a sealing system in accordance with the present description, and the elements shown in these figures are associated with numerical references.

Such a sealing system may be implemented by way of example and not necessarily by any of the three embodiments shown in FIGS. 4 to 15.

More precisely, the first embodiment is shown in FIGS. 4 to 9C and the elements shown in these figures are associated with numerical references corresponding to those used in FIGS. 1 to 3 followed in this embodiment by the letter "A" to identify this first embodiment.

The second embodiment is shown in FIGS. 10 to 13C and the elements shown in these figures are associated with numerical references corresponding to those used in FIGS. 1 to 3 followed in this example by the letter "B" to identify this second embodiment.

Figure 14:
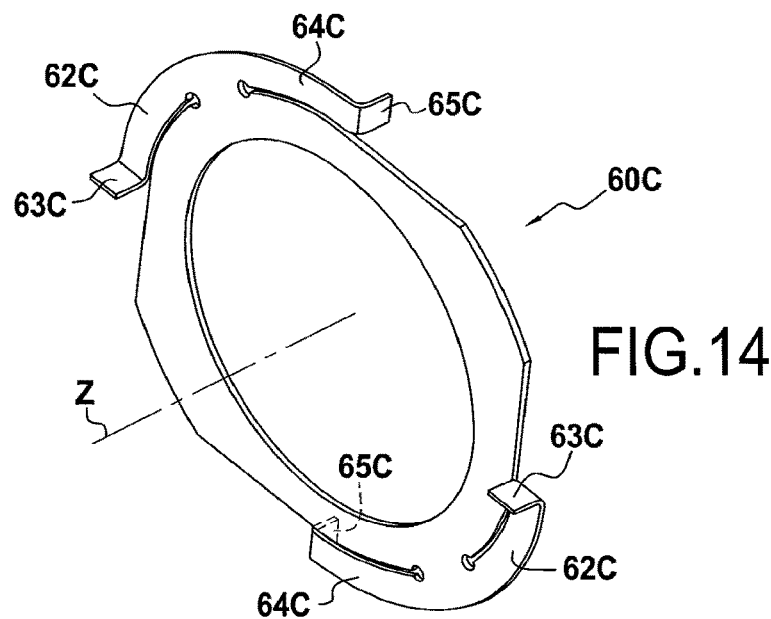
FIG. 14 is a perspective view of a coupling part in a third embodiment of this sealing system in accordance with the present description.
Figure 15:
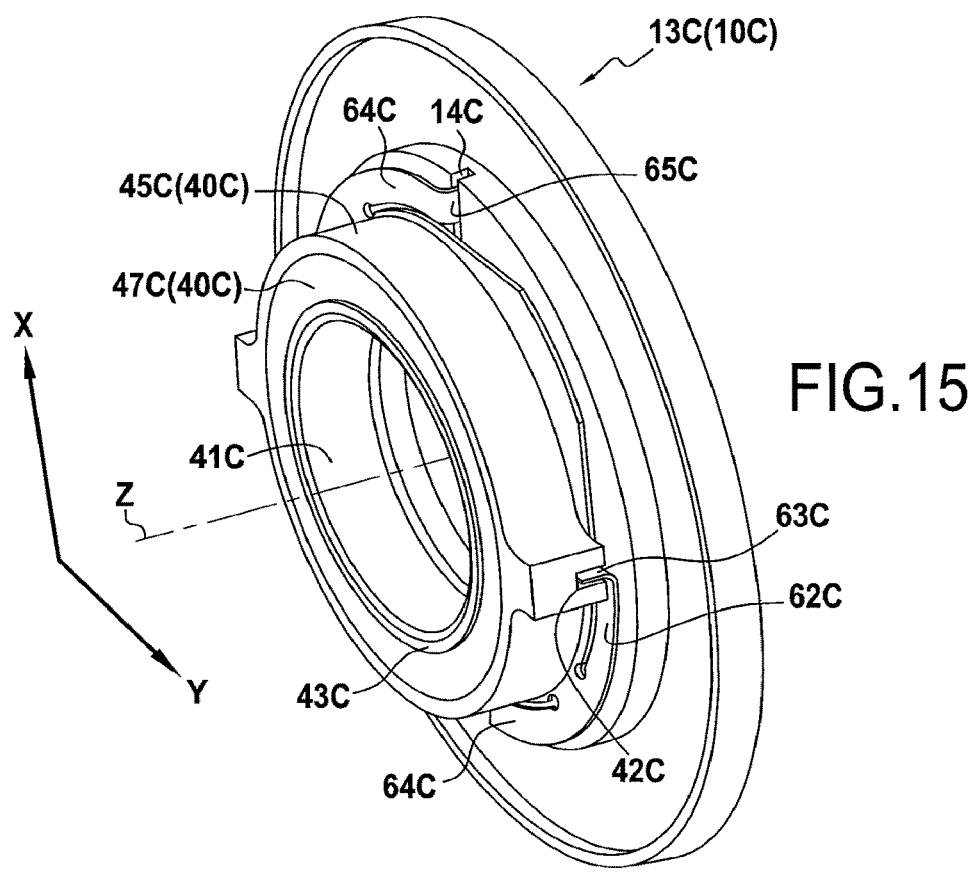
FIG. 15 is a fragmentary perspective view of this third embodiment.

The third embodiment is shown in FIGS. 14 and 15 and the elements shown in these figures are associated with numerical references corresponding to those used in FIGS. 1 to 3, followed in this embodiment by the letter "C" to identify this third embodiment.

The description begins with characteristics that are considered, arbitrarily, as being common for each of these embodiments.

A sealing system in accordance with the present description is a sealing system having at least one floatingly mounted ring 40, 40A-81C (i.e. 40, 40A, 40B, and 40C, this convention applying equally for the other numerical references below) in a support 10, 10A-10C of a shaft 20, 20A-20C rotatable about an axis extending along a longitudinal direction Z in order to provide dynamic sealing between the shaft 20, 20A-20C and the support 10, 10A-10C.

The sealing system comprises a coupling part 60, 60A-60C interposed between the ring 40, 40A-40C and the support 10, 10A-10C, via which the ring 40, 40A-40C is secured to the support 10, 10A-10C.

The support 10, 10A-10C and the coupling part 60, 60A-60C include first respective joint portions 14, 14A-14C and 64, 64A-64C suitable for co-operating together to provide a first kinematic joint allowing relative movement between the support 10, 10A-10C and the coupling part 60, 60A-60C of the sliding pivot type (i.e. of the cylindrical joint type) directed along a first transverse direction X that is defined in a transverse plane that is perpendicular to the longitudinal direction Z.

By means of this first kinematic joint, the support 10, 10A-10C and the coupling part 60, 60A-60C can both move in translation relative to each other along the first transverse direction X and can also pivot relative to each other about the first transverse direction X.

The ring 40, 40A-40C and the coupling part 60, 60A-60C include second respective joint portions 42, 42A-42C and 62, 62A-62C suitable for co-operating together to make a second kinematic joint allowing relative movement between the ring 40, 40A-40C and the coupling part 60, 60A-60C of the sliding pivot type directed along a second transverse direction Y that is perpendicular to the first transverse direction X and perpendicular to the longitudinal direction Z.

By means of this second kinematic joint, the ring 40, 40A-40C and the coupling part 60, 60A-60C can both move in translation relative to each other along the second transverse direction Y and pivot relative to each other about the second transverse direction Y.

Sealing J1, referred to as "primary" sealing (see FIGS. 2 and 3) can thus be achieved effectively at an interface between a circumferential surface of the rotary shaft 20, 20A-20C and a circumferential surface 41A-41C of the ring 40, 40A-40C, with this continuing to be effective even in the event of transverse movements of the rotary shaft 20, 20A-20C relative to the support 10, 10A-10C (i.e. any movement singly or in combination among a movement in translation along the first transverse direction X, a movement in translation along the second transverse direction Y, a movement in rotation about an axis defined by the first transverse direction X, and a movement in rotation about an axis defined by the second transverse direction Y).

In these examples, the rotary shaft 20, 20A-20C is a rotary shaft of a rotary machine, in particular a turbomachine, specifically a turbopump (not shown) incorporating the sealing system to provide sealing between a pump portion and a turbine portion of the turbopump.

In these examples, the sealing system comprises a first pair of first joint portions 14, 14A-14C and 64, 64A-64C belonging respectively to the support 10, 10A-10C and to the coupling part 60, 60A-60C and configured to co-operate mutually; and a second pair of first joint portions 14, 14A-14C and 64, 64A-64C belonging respectively to the support 10, 10A-10C and to the coupling part 60, 60A-60C and configured to co-operate mutually, these first and second pairs being spaced apart from each other along the first transverse direction X, in particular by being arranged at 180° to each other about the axis extending along the longitudinal direction Z (see in particular FIG. 1).

In these examples, the sealing system includes a first pair of second joint portions 42, 42A-42C and 62, 62A-62C belonging respectively to the ring 40, 40A-40C and to the coupling part 60, 60A-60C and configured to co-operate mutually; and a second pair of second joint portions 42, 42A-42C and 62, 62A-62C belonging respectively to the ring 40, 40A-40C and to the coupling part 60, 60A-60C and configured to co-operate mutually, these first and second pairs being spaced apart from each other along the second transverse direction Y, in particular by being arranged at 180° C. to each other relative to the axis directed along the longitudinal direction Z.

In these examples, the ring 40, 40A-40C is constituted by two generally annular parts 45A-45C and 47A-47C that are distinct and concentric and that are assembled together to form a single unit. In particular, the first of these two annular parts 47A-47C, which is of smaller outside diameter and which is to have the rotary shaft 20A-20C passing directly therethrough, is made out of a material that is softer than the material forming the rotary shaft, so as to give preference to wear of the circumferential surface 41A-41C of this first annular part over wear of the circumferential surface of the rotary shaft that is to face the circumferential surface 41A-41C in order to form the primary sealing. Furthermore, in this example, the second of these two annular parts 45A-45C, which is of greater outside diameter, is assembled rigidly to the first annular part 47A-47C (i.e. once they are assembled together, the two annular parts cannot move relative to each other). The second joint portions 42A-42C associated with the ring 40, 40A-40C are formed in this second annular part 45A-45C.

In these examples, the coupling part 60, 60A-60C is:
of overall annular shape;
constituted by a single part; and
made of a metal material.

In these examples, the support 10, 10A-10C and the ring 40, 40A-40C comprise third respective joint portions 15A, 15B, 43A-43C suitable for co-operating together to provide a third kinematic joint allowing relative movement between the support 10, 10A-10C and the ring 40, 40A-40C of the plane bearing type (i.e. of the planar joint type) in a transverse plane perpendicular to the longitudinal direction Z.

Sealing J2, referred to as "secondary" sealing (see FIGS. 2 and 3), can thus be provided effectively at an interface between a transverse plane surface 15A, 15B of the support 10, 10A-10C and a transverse plane surface 43A-43C of the ring 40, 40A-40C. As their name indicates, these transverse plane surfaces are perpendicular to the longitudinal direction Z.

In these examples, the sealing system comprises a bias element 50, 50A, 50B suitable for co-operating with the support 10, 10A-10C and the ring 40, 40A-40C in order to bias co-operation of the respective third joint portions 15A, 15B, 43A-43C.

In these examples, the support 10, 10A-10C includes two distinct parts 11A-11C and 13A-13C that are assembled together by conventional fastener means such as nuts and bolts. These two parts extend on either side of the ring 40, 40A-40C and the coupling part 60, 60A-60C in the longitudinal direction Z. In particular, a first of these two parts 11A-11C has a transverse plane surface 15A-15C that is to face the transverse plane surface 43A-43C of the ring 40, 40A-40C in order to provide the secondary sealing. The second of these two parts 13A-13C comprises a portion that extends transversely and that is spaced along the longitudinal direction Z apart from the transverse plane surface 15A-15C, with the ring 40, 40A-40C being interposed between them. In these examples, this example of the second part 13A-13C constitutes a bearing location for a first portion of the bias element 50, 50A-50C, while a second portion of this element bears elastically against the ring 40, 40A-40C.

There follows a description in greater detail of the specific features of the first embodiment.

In the first embodiment, each of the first and second joint portions 14A, 64A and 42A, 62A is non-deformable (under normal conditions of utilization of the sealing system).

Figure 4:
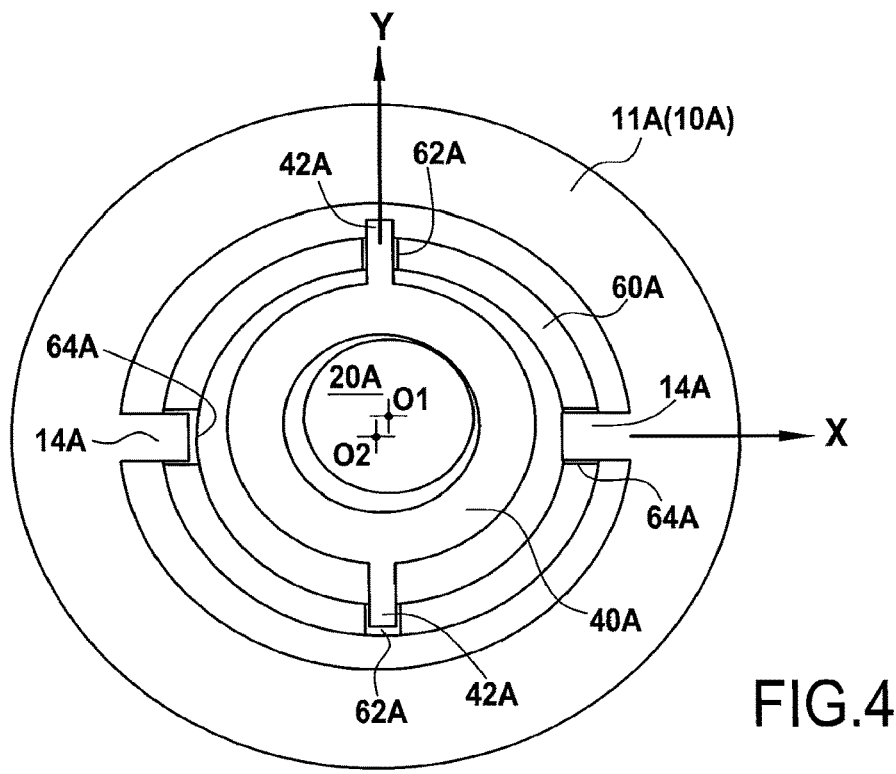
FIG. 4 is a section view in a transverse plane of a first embodiment of the sealing system in accordance with the present description, in which the rotary shaft occupies a first position in this transverse plane.
Figure 5:
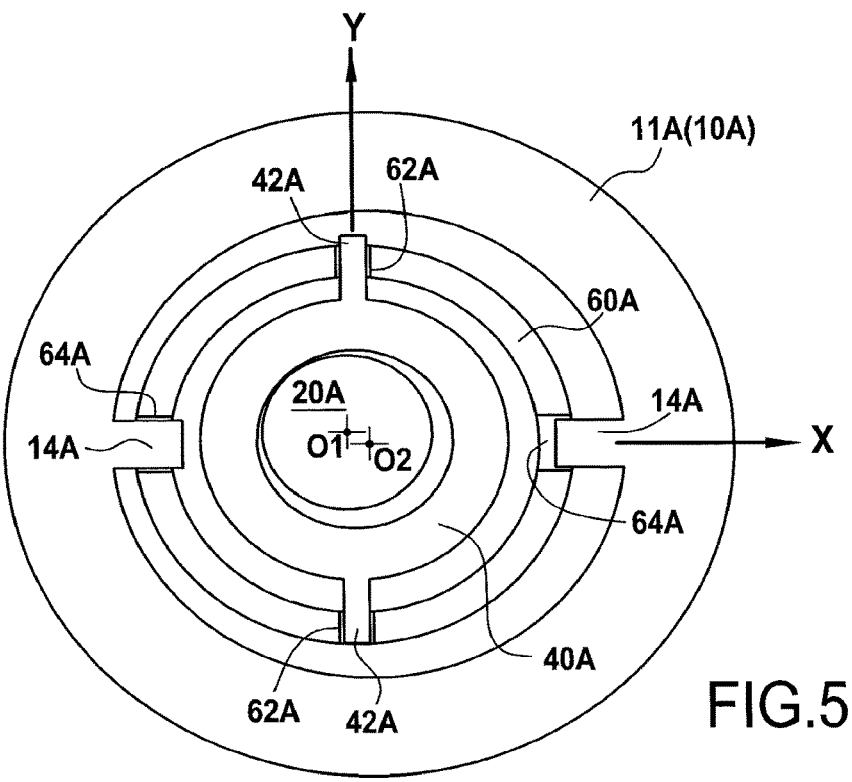
FIG. 5 is a view analogous to that of FIG. 4, in which the rotary shaft occupies a second position in this transverse plane.
Figure 6:
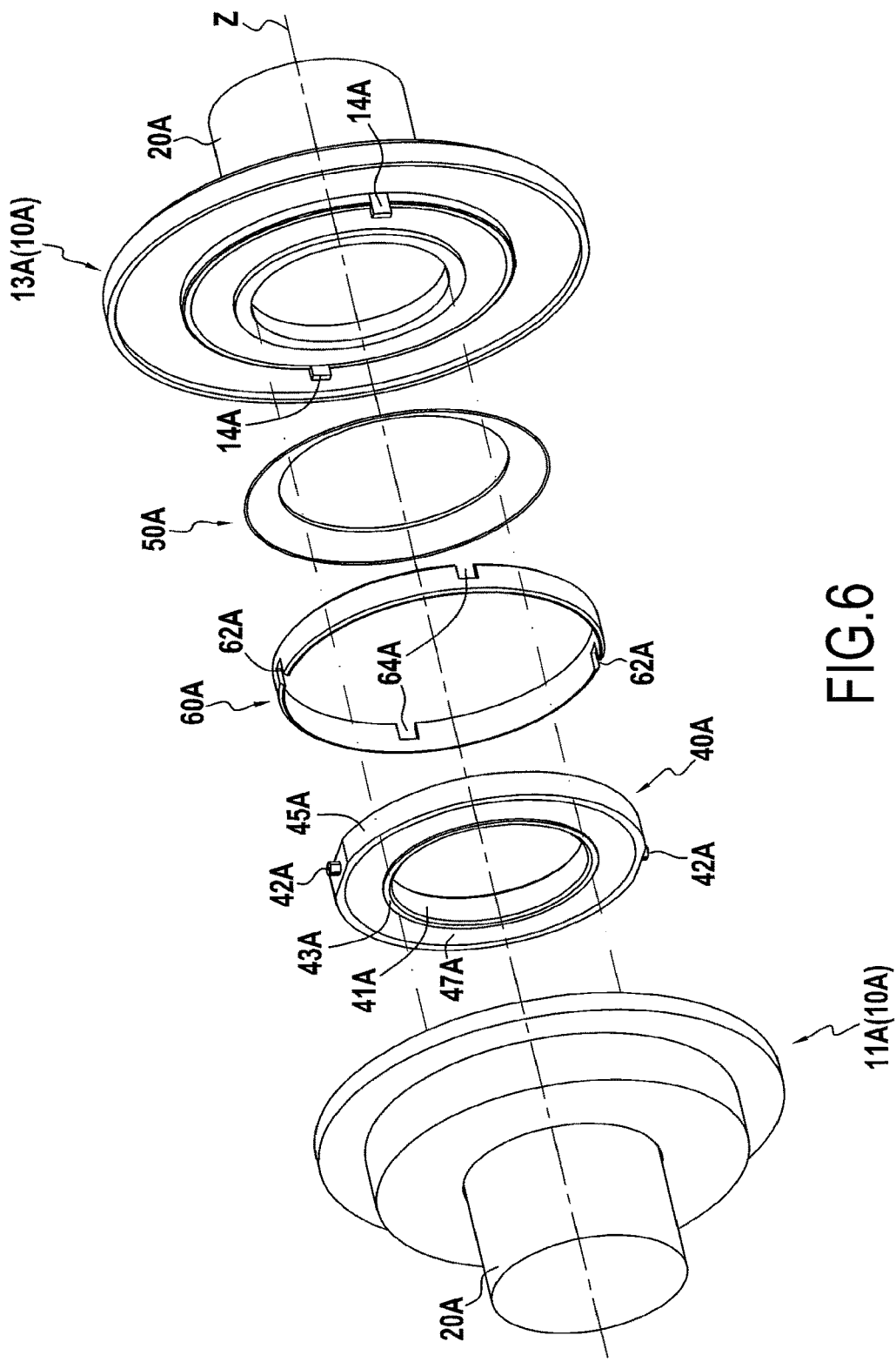
FIG. 6 is an exploded perspective view of this first embodiment.
Figure 7:
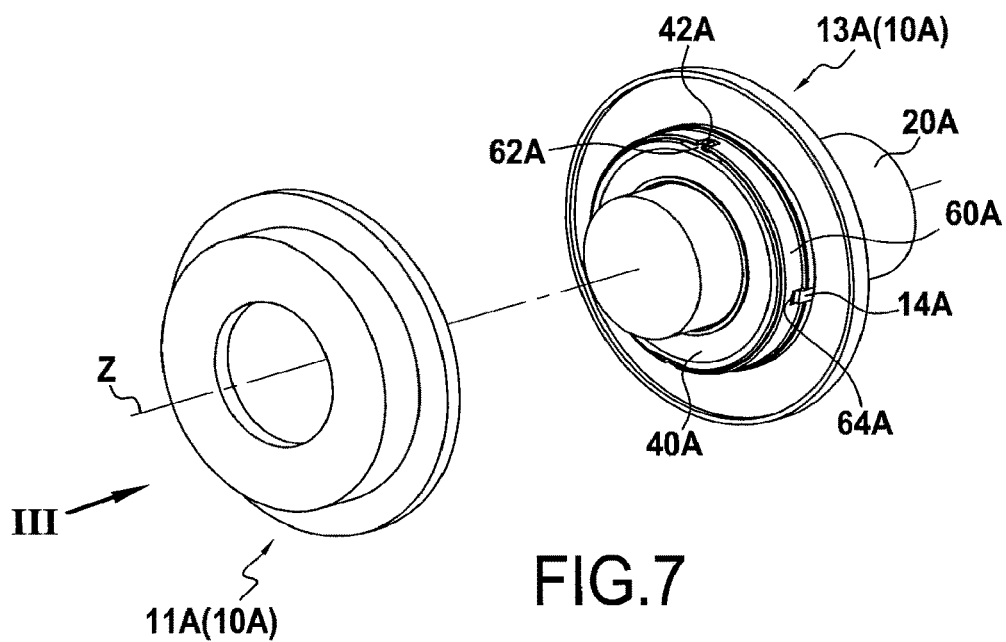
FIG. 7 is a view analogous to FIG. 6 in which only a first support part is shown separated from the other part.
Figure 8:
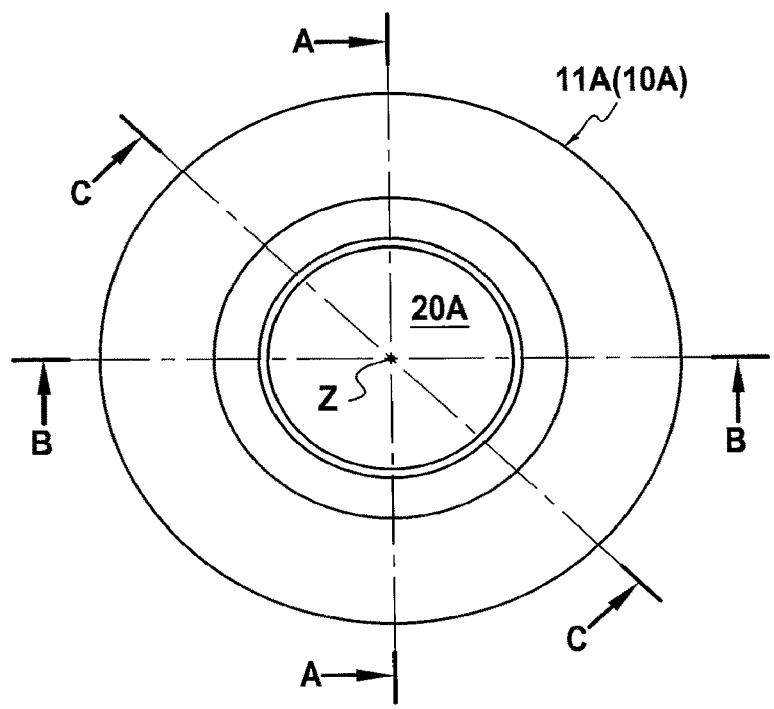
FIG. 8 is a planar view in a transverse plane of this first embodiment.
Figure 10:
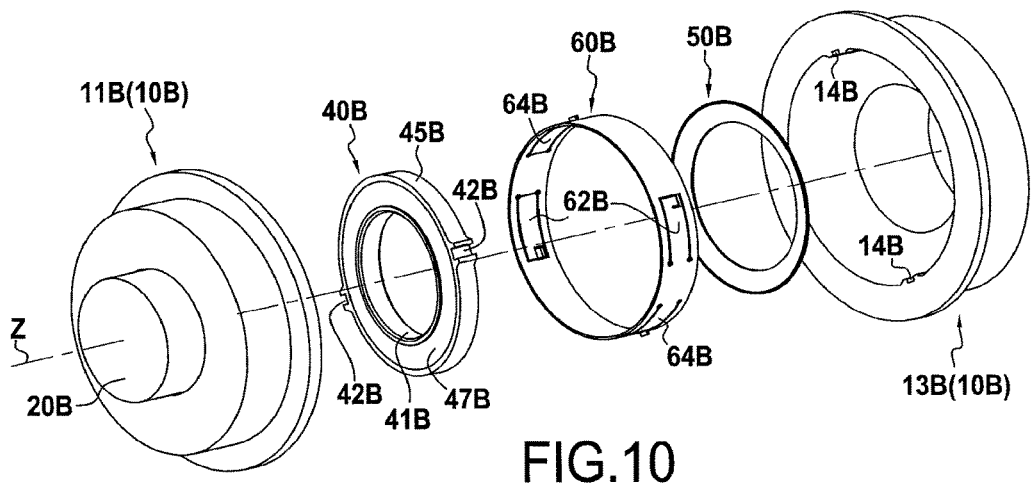
FIG. 10 is an exploded perspective view of a second embodiment of the sealing system in accordance with the present description.

For this purpose, the first joint portions are constituted by studs 14A projecting from the support 10A (in particular from the second part 13A of the support); and by recesses 64A that are formed in the coupling part 60A and that are suitable for co-operating with the studs 14A in order to provide the first kinematic joint allowing cylindrical joint type relative movement between the support 10A and the coupling part 60A with respect to the first transverse direction X (see in particular FIGS. 4, 5, and 9B).

Nevertheless, without going beyond the ambit of the present description, it would be possible to provide for at least one of these studs to be on the coupling part and at least one corresponding recess in the support.

The second joint portions are constituted by studs 42A projecting from the ring 40A (in particular from the second annular part 45A) of the ring; and by recesses 62A that are formed in the coupling part 60A and that are suitable for co-operating with the studs 42A to provide the second kinematic joint allowing cylindrical joint type relative movement between the ring 40A and the coupling part 60A with respect to the second transverse direction Y (see in particular FIGS. 4, 5, and 9A).

Nevertheless, without going beyond the ambit of the present description, it will be possible to provide for at least one of these studs to be arranged on the coupling part and for at least the corresponding recess to be arranged in the ring.

As can be clearly seen in FIGS. 4 and 5, the studs 14A are spaced apart along the first transverse direction X, while the studs 42A are spaced apart along the second transverse direction Y, which is perpendicular to the first transverse direction X. Likewise, the recesses 64A are spaced apart along the first transverse direction X, while the recesses 62A are spaced apart along the second transverse direction Y. The ring 40A can follow the movements in translation and in rotation of the rotary shaft 20A in a transverse plane defined by the first and second directions X and Y (see the difference in position of the ring between FIGS. 4 and 5, when the center O1 of the rotary shaft moves in this transverse plane relative to a reference point O2 of the support 10A) given the shapes of the studs 42A, 14A and of the associated recesses 62A, 64A, which can co-operate in particular by providing functional clearances that allow such movements in translation and in rotation with respect to the first and second directions X and Y. In contrast, the shapes of the recesses 62A, 64A and of the studs 42A, 14A prevent the ring from being driven in rotation about the drive axis of the rotary shaft, defined along the longitudinal direction Z.

In this example, the recesses 62A, 64A allow the studs 42A, 14A to move in translation along the longitudinal direction Z, which can make it easier to maintain co-operation between the third joint portions 43A, 15A providing the above-mentioned third kinematic joint.

In this first example, the coupling part 60A and the bias element 50A are dissociated from each other. In particular, the bias element 50A is in the shape of a springy metal frustoconical part (without going beyond the ambit of the present description, and in non-limiting manner, it would also be possible to use one or more undulating springs or any other resilient means), having a first end portion that bears against the support 10A (in particular on the portion of the second part 13A of the support that extends transversely); and a second end portion opposite from the first that bears against the ring 40A (in particular against a plane transverse surface of the second annular part 45A of the ring and/or of the first annular part 47A).

Specific features of the second embodiment are described in greater detail below.

In the second embodiment, the first joint portions 64B belonging to the coupling part 60B are suitable for being deformed elastically in bending, while the associated first joint portions 14B, which belong to the support 10B, are not deformable (under normal conditions of utilization of the sealing system).

In particular, each of the first joint portions 64B is constituted by a blade having a first end elastically connected to the coupling part 60B so that the blade can pivot elastically at this first end relative to the coupling part 60B about a pivot axis that is parallel to the longitudinal direction Z; and a second end opposite from the first end and from which a tongue 65B projects to the outside the coupling part 60B, the tongue 65B extending in a transverse plane perpendicular to the longitudinal direction Z.

Figure 11:
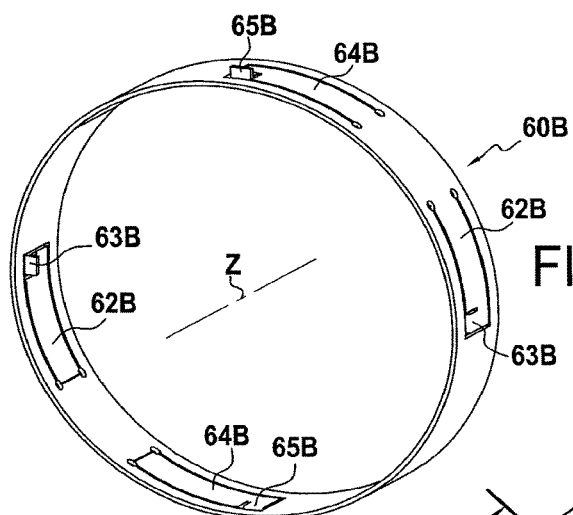
FIG. 11 is a perspective view of a coupling part of this second embodiment shown in isolation.
Figure 12:
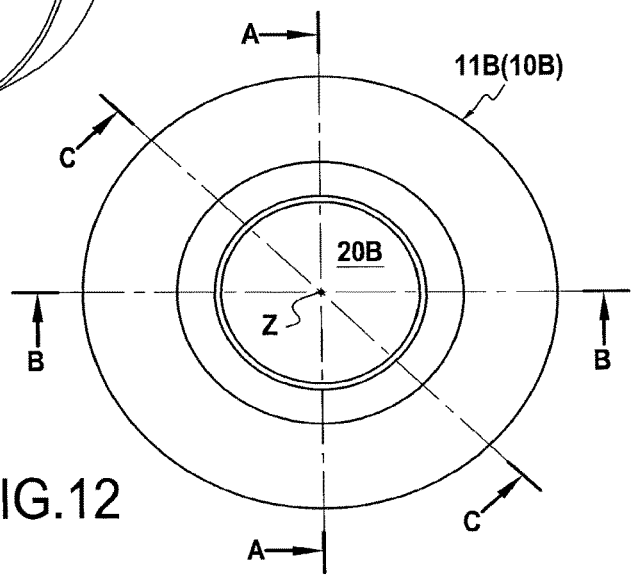
FIG. 12 is a planar view in a transverse plane of this second embodiment.
Figure 13A:
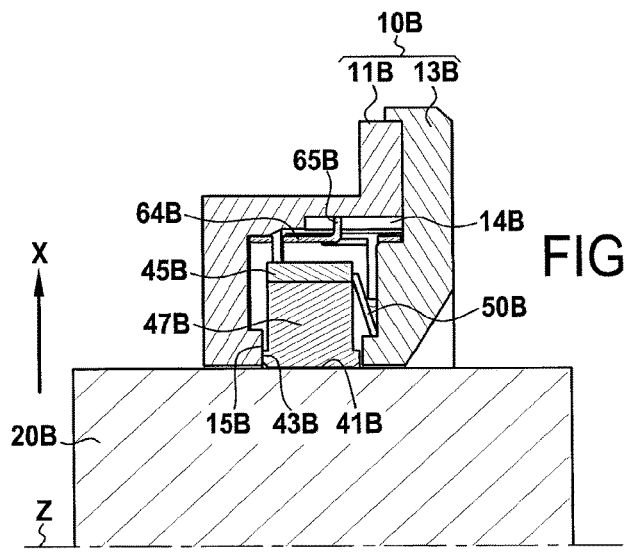
FIGS. 13A, 13B, and 13C are fragmentary section views respectively on planes A-A (along the first transverse direction X), B-B (along the second transverse direction Y), and C-C, as shown in FIG. 12.

Each of the first joint portions 14B is constituted by a recess suitable for co-operating with the corresponding tongue 65B so as to provide, by means of the elastic deformations of the blades, the first kinematic joint allowing cylindrical joint type relative movement between the support 10B and the coupling part 60B with respect to the first transverse direction X (see in particular FIGS. 11 and 13A). In this example, each tongue 65B can slide in the associated recess 14B along the longitudinal direction Z, thus making it easier to maintain co-operation of the third joint portions providing the above-mentioned third kinematic joint.

Nevertheless, without going beyond the ambit of the present description, provision can be made to arrange at least one of the blades on the support and at least the corresponding recess in the coupling part.

Furthermore, in the second embodiment, the second joint portions 62B belonging to the coupling part 60B are suitable for being deformed elastically in bending, while the associated second joint portions 42B, which belong to the ring 40B, are not deformable (under normal conditions of utilization of the sealing system).

In particular, each of the second joint portions 62B is constituted by a blade having a first end that is elastically connected to the coupling part 60B in such a manner as to enable the blade to pivot elastically at this first end relative to the coupling part 60B about a pivot axis parallel to the longitudinal direction Z; and a second end opposite from the first end and from which a tongue 63B projects into the inside of the coupling part 60B, the tongues 65B lying in a transverse plane perpendicular to the longitudinal direction Z, in particular in the same transverse plane as that in which the tongues 65B lie.

Figure 13B:
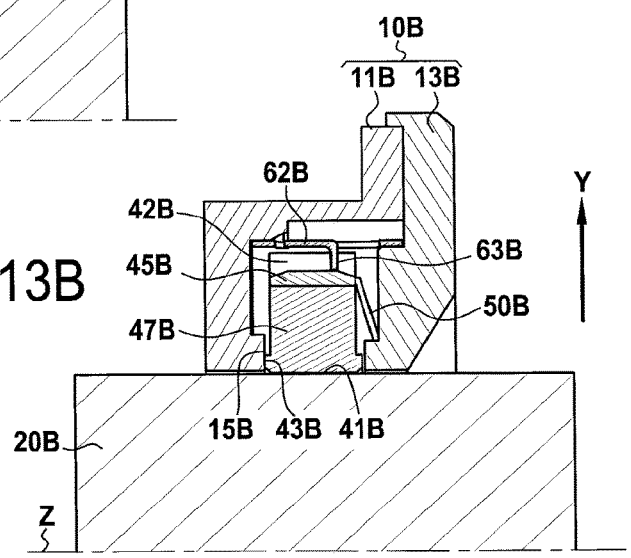
Figure 13C:
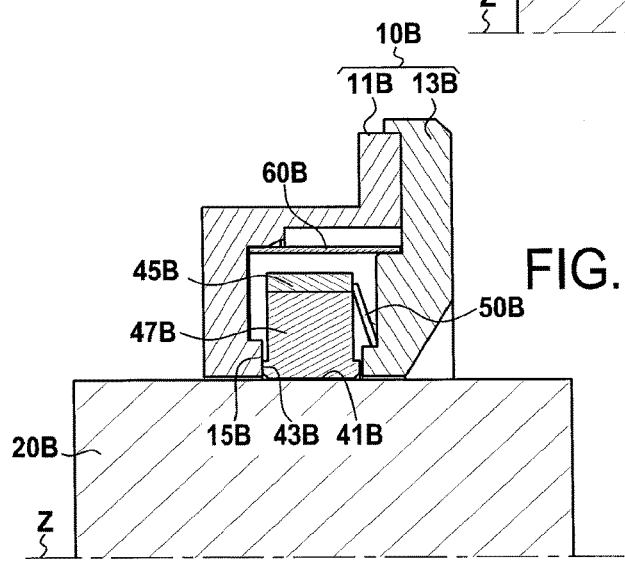

Each of the second joint portions 42B is constituted by a recess suitable for co-operating with the corresponding tongue 63B so as to constitute, by means of the elastic deformations of the blades, the second kinematic joint allowing cylindrical joint type relative movement between the ring 40B and the coupling part 60B with respect to the second transverse direction Y (see in particular FIGS. 11 and 13B).

In this example, each tongue 63B can slide in the associated recess along the longitudinal direction Z, which can make it easier to maintain co-operation of the third joint portions providing the above-mentioned third kinematic joint.

Nevertheless, without going beyond the ambit of the present description, provision can be made to arrange at least one of these blades on the ring and at least one corresponding recess in the coupling part.

In this second embodiment, the blades 64B are spaced apart in the first transverse direction X (in particular they are arranged at 180° relative to each other about the axis extending along the longitudinal direction Z), while the blades 62B are spaced apart along the second transverse direction Y (in particular they are arranged at 180° to each other about the axis extending along the longitudinal direction Z), which second transverse direction Y is perpendicular to the first transverse direction X. Likewise, the recesses 14B are spaced apart in the first transverse direction X (in particular being arranged at 180° relative to each other about the axis directed along the longitudinal direction Z), while the recesses 42B are spaced apart along the second transverse direction Y (in particular being arranged at 180° relative to each other about the axis directed along the longitudinal direction Z). The ring 40B can follow movements in translation (radial movements) of the rotary shaft 20B in a transverse plane defined by the first and second directions X and Y by bending type elastic deformation of the blades 62B and 64B relative to the coupling part 60B and to the support 10B. The ring 40B may also follow movements in rotation of the rotary shaft 20B about the axes defined by the first and second directions X and Y because of the shapes of the tongues 63B, 65B and of the associated recesses 42B, 14B, which in particular can co-operate by providing functional clearances that allow for such movements in rotation. In contrast, the shapes of the recesses 14B, 42B and of the blades 64B, 62B (and in particular their tongues 65B, 63B) prevent the ring from being driven in rotation about the drive axis of the rotary shaft defined along the longitudinal direction Z.

In this second embodiment, the coupling part 60B and the bias element 50B are associated with each other. In particular, the bias element 50B is analogous to the bias element of the above-described first embodiment (see in particular FIGS. 13A to 13C). It is therefore not described again for the second embodiment for reasons of concision in the present description.

The specific features of the third embodiment are described in greater detail below.

In the third embodiment (see FIGS. 14 and 15), the first joint portions 64C belonging to the coupling part 60C are suitable for being deformed elastically in bending, while the associated first joint portions 14C, which belong to the support 10C, are not deformable (under normal conditions of utilization of the sealing system).

In particular, each of the first joint portions 64C is constituted by a blade having a first end elastically connected to the coupling part 60C so that the blade can pivot elastically at this first end relative to the coupling part 60C about a pivot axis perpendicular to the longitudinal direction Z; and a second end opposite from the first end and from which a tongue 65C projects away from the coupling part 60C and away from the ring 40C, the tongue 65C lying in a plane that is parallel to the longitudinal direction and parallel to the first direction X.

Each of the first joint portions 14C is constituted by a recess suitable for co-operating with the corresponding tongue 65C to provide the first kinematic joint, in this example by means of the elastic deformations of the blades and by means of the clearance that exists between the tongue 65C and the recess 14C enabling the tongue 65C and the recess 14C to move in translation or to pivot relative to each other with respect to the first transverse direction X, the first kinematic joint thus allowing for cylindrical joint type relative movement between the support 10C and the coupling part 60C with respect to the first transverse direction X.

In this example, each tongue 64C can slide in the associated recess in the longitudinal direction Z, which can make it easier to maintain co-operation of the third joint portions providing the above-mentioned third kinematic joint.

Nevertheless, without going beyond the ambit of the present description, provision can be made to arrange at least one of these blades on the support and at least the corresponding recess in the coupling part.

Furthermore, in the third embodiment, the second joint portions 62C belonging to the coupling part 60C are suitable for being deformed elastically in bending, while the associated second joint portions 42C, which belong to the ring 40C, are not deformable (under normal conditions of utilization of the sealing system).

In particular, each of the second joint portions 62C is constituted by a blade having a first end elastically connected to the coupling part 60C so that the blade can pivot elastically at this first end relative to the coupling part 60C about a pivot axis perpendicular to the longitudinal direction Z; and a second end opposite from the first end and from which a tongue 63C projects away from the coupling part 60B and towards the ring 40C, the tongue 63C lying in a plane that is parallel to the longitudinal direction Z and parallel to the second transverse direction Y.

Each of the second joint portions 42C is constituted by a recess suitable for co-operating with the corresponding tongue 63C in order to provide the second kinematic joint, in this example by means of the elastic deformations of the blades and by means of the clearance existing between the tongue 63C and the recess 42C enabling the tongue 63C and the recess 42C to move in translation and to pivot relative to each other with respect to the second transverse direction, which second kinematic joint authorizes cylindrical joint type relative movement between the ring 40C and the coupling part 60C with respect to the second transverse direction Y.

In this embodiment, each tongue 62C can slide in the associated recess along the longitudinal direction Z, thus making it easier to maintain co-operation between the third joint portions providing the above-mentioned third kinematic joint.

Nevertheless, without going beyond the ambit of the present description, provision can be made to arrange at least one of the blades on the ring and at least the corresponding recess in the coupling part.

In this third embodiment, the blades 64C are spaced apart along the first transverse direction X (in particular being arranged at 180° relative to each other about the axis directed along the longitudinal direction Z), while the blades 62C are spaced apart along the second transverse direction Y (in particular being arranged at 180° relative to each other about the axis directed along the longitudinal direction Z), which second transverse direction Y is perpendicular to the first transverse direction X. Likewise, the recesses 14C are spaced apart along the first transverse direction X (in particular being arranged at 180° relative to each other about the axis directed along the longitudinal direction Z), while the recesses 42C are spaced apart along the second transverse direction Y (in particular being arranged at 180° relative to each other about the axis directed along the longitudinal direction Z). The ring 40C can follow movements in rotation of the rotary shaft 20C about the first and second directions X and Y by bending type elastic deformation of the tongues 62C and 64C relative to the coupling part 60C and to the support 10C. The ring 40C can also follow movements in translation (radial movements) of the rotary shaft 20C along the first and second directions X and Y because of the shapes of the tongues 63C, 65C and of the associated recesses 42C, 14C, which in particular can co-operate by providing functional clearances that allow such movements in translation. In contrast, the shapes of the recesses 14C, 42C and of the blades 64C, 62C (and in particular of their tongues 65C, 63C) prevent the ring from being driven in rotation about the drive axis of the rotary shaft defined along the longitudinal direction Z.

In this third embodiment, the coupling part 60C and the bias element are formed as a single unit. In particular, the bias element is constituted by the resilient blades 62C, 64C. More particularly, the bias element comprises a first end portion that is defined by the blades 64C and that comes to bear against the support 10C (in particular against the portion of the second part 13C of the support that extends transversely) by means of the tongues 65C of these blades 64C that project away from the ring 40C (in particular towards the second part 13C); and a second end portion opposite from the first that is defined by the blades 62C and that comes to bear against the ring 40C (in particular against the second annular part 45C of the ring) via the tongues 63C and the blades 62C that project towards the ring 40C.

The embodiments or implementations described in the present description are given by way of non-limiting illustration, and in the light of this description a person skilled in the art can easily modify these embodiments or implementations or envisage others, while remaining within the ambit of the invention.

Furthermore, the various characteristics of these embodiments or implementations can be used singly or can be combined with one another. When they are combined, these characteristics may be combined as described above or in other ways, the invention not being limited to the specific combinations described in the present description. In particular, unless specified to the contrary, any characteristic described with reference to any one of the embodiments or implementations may be applied in analogous manner to any other embodiment or implementation.

The invention claimed is:

1. A sealing system for at least one floatingly mounted ring in a support for a rotary shaft rotatable about an axis directed along a longitudinal direction in order to provide dynamic sealing between the shaft and the support, the system comprising:
    a coupling part interposed between the floatingly mounted ring and the support, whereby the floatingly mounted ring is secured to the support, the support and the coupling part comprising respective first joint portions constituted by a stud and a first recess suitable for co-operating together to provide a first kinematic joint allowing cylindrical joint type relative movement between the support and the coupling part with respect to a first transverse direction; and the floatingly mounted ring and the coupling part comprising second respective joint portions constituted by a stud and a second recess suitable for co-operating together to provide a second kinematic joint allowing cylindrical joint type relative movement between the floatingly mounted ring and the coupling part with respect to a second transverse direction perpendicular to the first transverse direction,
    wherein one of the first joint portions provided on one of the support or the coupling part includes the first recess extending in the longitudinal direction which receives the first joint portion of the other of the support or the coupling part passing therethrough,
    wherein one of the second joint portions provided on one of the floatingly mounted ring or the coupling part includes the second recess extending in the longitudinal direction which receives the second joint portion of the other of the floatingly mounted ring or the coupling part passing therethrough, and
    wherein the first and second kinematic joints allow translational and pivotal movements.

2. The system as claimed in claim 1, wherein each of the first joint portions is not deformable.

3. The system as claimed in claim 1, wherein each of the second joint portions is not deformable.

4. The system as claimed in claim 1, wherein at least one of the first joint portions is suitable for being deformed elastically in bending.

5. The system as claimed in claim 1, wherein at least one of the second joint portions is suitable for being deformed elastically in bending.

6. The system as claimed in claim 1, wherein at least one of the first joint portions is suitable for being deformed elastically in twisting.

7. The system as claimed in claim 1, wherein at least one of the second joint portions is suitable for being deformed elastically in twisting.

8. The system as claimed in claim 1, wherein the support and the floatingly mounted ring comprise third respective joint portions suitable for co-operating together to provide a third kinematic joint allowing planar joint type relative movement between the support and the floatingly mounted ring in a transverse plane.

9. The system as claimed in claim 8, further comprising a bias element suitable for co-operating with the support and the floatingly mounted ring to bias the co-operation between the respective third joint portions.

10. The system as claimed in claim 9, wherein the coupling part and the bias element are dissociated one from the other.

11. The system as claimed in claim 9, wherein the coupling part and the bias element are formed as a single unit.

12. The system as claimed in claim 9, wherein the transverse plane and the bias element are arranged longitudinally on either side of the floatingly mounted ring.

13. A turbopump comprising:
    a rotary shaft and the sealing system according claim 1.

* * * * *